United States Patent
Lin et al.

(10) Patent No.: US 10,573,305 B2
(45) Date of Patent: Feb. 25, 2020

(54) VOICE CONTROL SYSTEM AND METHOD THEREOF

(71) Applicant: REALTEK SEMICONDUCTOR CORP., Hsinchu (TW)

(72) Inventors: Chia-Chiang Lin, Hsinchu (TW); Yi-Huan Wang, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 167 days.

(21) Appl. No.: 15/622,455

(22) Filed: Jun. 14, 2017

(65) Prior Publication Data

US 2017/0365257 A1  Dec. 21, 2017

(30) Foreign Application Priority Data

Jun. 15, 2016  (TW) .............................. 105118754 A

(51) Int. Cl.
*G10L 15/00* (2013.01)
*G10L 15/22* (2006.01)
*G10L 15/08* (2006.01)
*G10L 19/00* (2013.01)
*G10L 25/78* (2013.01)

(52) U.S. Cl.
CPC .............. *G10L 15/22* (2013.01); *G10L 15/08* (2013.01); *G10L 19/00* (2013.01); *G10L 25/78* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| 2010/0004936 A1* | 1/2010 | Chao | H03F 1/305 704/500 |
| 2010/0057473 A1* | 3/2010 | Kong | G10L 19/18 704/500 |
| 2013/0080171 A1* | 3/2013 | Mozer | G10L 15/22 704/251 |
| 2014/0222436 A1* | 8/2014 | Binder | G06F 3/167 704/275 |
| 2014/0229184 A1* | 8/2014 | Shires | H04L 12/12 704/275 |

\* cited by examiner

*Primary Examiner* — Vu B Hang
(74) *Attorney, Agent, or Firm* — Li & Cai Intellectual Property (USA) Office

(57) ABSTRACT

Disclosed is a voice control system and method thereof. The voice control system is used in an electronic device and works in a sleep mode and a working mode. The voice control system comprises an audio detection module, an audio codec and a control module. Under the sleep mode, the audio detection module continually detects whether there is a wake-up speech in a received first audio data. If yes, the audio detection module generates a first indication signal and temporarily stores the following first audio data. When the control module is woken up by the first indication signal, the voice control system enters the working mode. Under the working mode, the control module drives the audio codec to read and process the temporarily stored first audio data to recognize control speech in the first audio data and to accordingly control the electronic device.

13 Claims, 6 Drawing Sheets

VOICE CONTROL SYSTEM AND METHOD THEREOF

BACKGROUND OF THE INVENTION

1. Field of the Invention

The instant disclosure relates to a voice control system and a voice control method; in particular, after providing a wake-up speech, a user does not need to wait for the voice control system to be woken up and can immediately say a control speech.

2. Description of Related Art

As the technology has developed, the voice control function has been provided to many kinds of electronic devices, which makes our lives more convenient. Generally, considering the power consumption of the electronic devices, a voice wake-up mechanism is used to activate the voice control system to execute the voice control function. Were it not for the wake-up mechanism, the received audio data would need to be continually transmitted to the processor in the voice control system to be processed and recognized, which results in a great power consumption.

Thus, in many voice control systems, a voice wake-up mechanism is used to activate the voice control system to execute the voice control function. In this manner, the voice control system can operate in sleep mode only with certain circuits/modules on, which are for implementing the voice wake-up mechanism. When the wake-up speech is detected by these circuits/modules, the entire voice control system will be woken up to recognize the control speech and to accordingly control the electronic device.

However, in practice, there is a time interval between the time when the wake-up speech is detected and the time when the entire voice control system is woken up and enters the working mode. Thus, after providing the wake-up speech, the user usually needs to take some time waiting for an indication to know that the voice control system is operating the working mode, and then he can say a control speech to control the electronic device.

SUMMARY OF THE INVENTION

The instant disclosure provides a voice control system that can be used in an electronic device. The voice control system operates in a sleep mode and a working mode, and comprises an audio detection module, an audio codec and a control module. In the sleep mode, the audio detection module continually detects whether there is a wake-up speech in a first audio data received by a microphone. The audio detection module generates a first indication signal when the wake-up speech is detected, and temporarily stores the first audio data detected after the wake-up speech. The audio codec is connected to the audio detection module, and the control module is connected to the audio detection module and the audio codec. The voice control system operates in the working mode after the control module is woken up by the first indication signal. In the working mode, the control module drives the audio codec to read and process the first audio data temporarily stored in the audio detection module to recognize a control speech and to accordingly control the electronic device.

The instant disclosure further provides a voice control method applied to a voice control system. The voice control system operates in a sleep mode and a working mode, and comprises an audio detection module, an audio codec and a control module. The audio codec is connected to the audio detection module, and the control module is connected to the audio codec and the audio detection module. The voice control method comprises: in the sleep mode, continually detecting whether there is a wake-up speech in a first audio data received by a microphone; generating a first indication signal when the wake-up speech is detected, and temporarily storing the first audio data detected after the wake-up speech; waking up the control module by the first indication signal to make the voice control system operate in the working mode; and in the working mode, driving the audio codec to read and process the first audio data temporarily stored in the audio detection module to recognize a control speech in the first audio data and to accordingly control the electronic device.

To sum up, in the voice control system and the voice control method provided by the instant disclosure, the audio detection module can temporarily store the audio data. Thus, after providing the wake-up speech, a user does not need to wait and check whether the voice control system is woken up but can immediately say a control speech to control his electronic device, which is convenient.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. Like reference numbers refer to like elements throughout.

There are embodiments provided in the following description to illustrate a voice control system in the instant disclosure. The voice control system can be used in many kinds of electronic devices, such as a smart phone, a tablet or the like. A user can wake up the voice control system by providing a wake-up speech, and then can use the electronic device, for example, to dial a number or to position the electronic device, by saying a control speech to the voice control system.

[An Embodiment of the Voice Control System]

Figure 1:
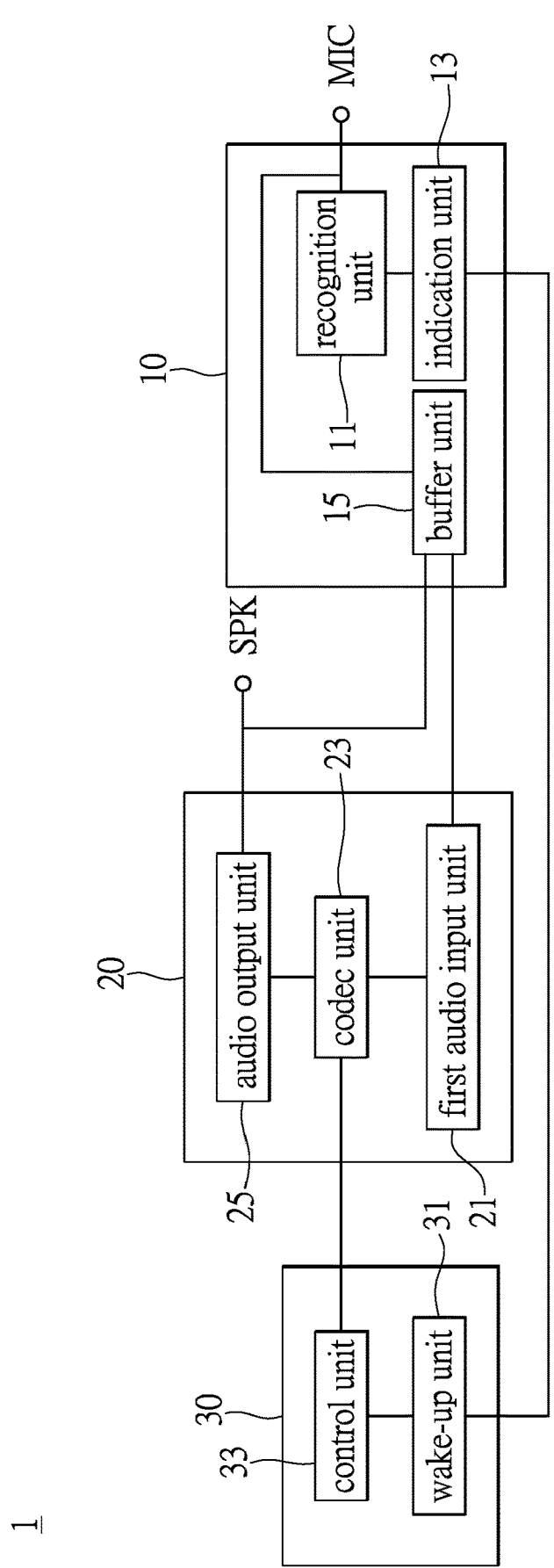
FIG. 1 shows a block diagram of a voice control system of one embodiment of the instant disclosure.

Referring to FIG. 1, FIG. 1 shows a block diagram of a voice control system of one embodiment of the instant disclosure. The voice control system 1 operates in a sleeping mode and a working mode. As shown in FIG. 1, the voice control system 1 comprises an audio detection module 10, an audio codec 20 and a control module 30. The audio codec 20 is connected to the audio detection module 10, and the control module 30 is connected to the audio codec 20 and the audio detection module 10. The audio detection module 10 is connected to a microphone MIC to receive an audio data, such as speech said by a user. For example, the microphone can be a built-in microphone of the electronic device.

The audio detection module 10 comprises a recognition unit 11, an indication unit 13 and a buffer unit 15. The indication unit 13 is connected to the recognition unit 11 and the control module 30. The buffer unit 15 is connected to the microphone MIC and the audio codec 20. The control module 30 comprises a wake-up unit 31 and a control unit 33. The wake-up unit 31 is connected to the indication unit 13 of the audio detection module 10, and the control unit 33 is connected to the wake-up unit 31. The audio codec 20 comprises a first audio input unit 21 and a codec unit 23. The first audio input unit 21 is connected to the buffer unit 15 of the audio detection module 10. The codec unit 23 is connected to the first audio input unit 21 and the control unit 33 of the control module 30.

When the voice control system 1 operates in the sleep mode, most of the modules in the voice control system 1 operate in the sleep mode and only the audio detection module 10 and the wake-up unit 31 of the control module 30 keep working to continually detect whether there is a wake-up speech in an audio data received by the microphone MIC. Herein, for ease of illustration, a first audio data refers to the audio data received by the microphone MIC in the following description.

The wake-up speech can be in any language, such as "Hello, computer!" or any speech that is defined by a system designer. When a wake-up speech is detected in the first audio data by the recognition unit 11, the recognition unit 11 controls the indication unit 13 to transmit a first indication signal to the wake-up unit 31. Simultaneously, the recognition unit 11 temporarily stores the first audio data, which is detected after the wake-up speech, in the buffer unit 15.

Generally speaking, there are two kinds of first audio data. One can be an analog signal and the other one can be a digital signal. If the first audio data is an analog signal, the first audio data is first converted to a digital signal through an analog-to-digital converter (not shown). The data format of this first audio data (e.g., a first sample rate, which may be 16 kHz) is determined according to the clock of the analog-to-digital converter and the speed of a digital filter (not shown). On the other hand, if the first audio data is a digital signal, a digital filter (not shown) converts the digital signal (not shown) to an PCM (Pulse-Code Modulation; PCM) signal. The data format of this first audio data (e.g., a first sample rate, which may be 16 kHz) is determined according to the speed of the digital filter. Details about the above audio process can be easily understood by those skilled in the art.

Even when the voice control system 1 operates in the sleeping mode, the wake-up unit 31 of the control module 30 is still working to continually detect whether there is a first indication signal transmitted from the indication unit 13 of the audio detection module 10. When the wake-up unit 31 receives the first indication signal, it indicates that a wake-up speech said by a user is detected by the audio detection module 10. Then, the wake-up unit 31 wakes up the control unit 33, and the control unit 33 drives the entire voice control system 1 to operate in the working mode.

At the same time as the indication unit 13 of the audio detection module 10 transmits a first indication signal to the wake-up unit 31 of the control module 30, the recognition unit 11 of the audio detection module 10 temporarily stores the first audio data, which is detected after the wake-up speech, in the buffer unit 15 of the audio detection module 10. In other words, after a user says a wake-up speech, all the following speeches said by the user are temporarily stored in the buffer unit 15. After the control unit 33 of the control module 30 is woken up by the first indication signal to drive the voice control system 1 to operate in the working mode, the control unit 33 controls the first audio input unit 21 to read the first audio data temporarily stored in the buffer unit 15. After that, the control unit 33 drives the codec unit 23 to process the read first audio data to recognize the control speech in the first audio data and to accordingly control the electronic device.

Because of the buffer unit 15 configured in the audio detection module 15, after a user provides a wake-up speech, he can say a control speech without a pause and the recognition unit 11 will temporarily store all the first audio data which is detected after the wake-up speech in the buffer unit 15. Briefly, after the user provides a wake-up speech, he can continue to say a control speech and does not need to wait for the voice control system 1 to be woken up.

By using the voice control system 1 provided in this embodiment, a user can smoothly control his electronic device by voice, even under some circumstances where it is hard for the user to check whether the voice control system has been woken up to recognize a control speech. For example, the user may be driving or walking.

[Another Embodiment of the Voice Control System]

Figure 2:
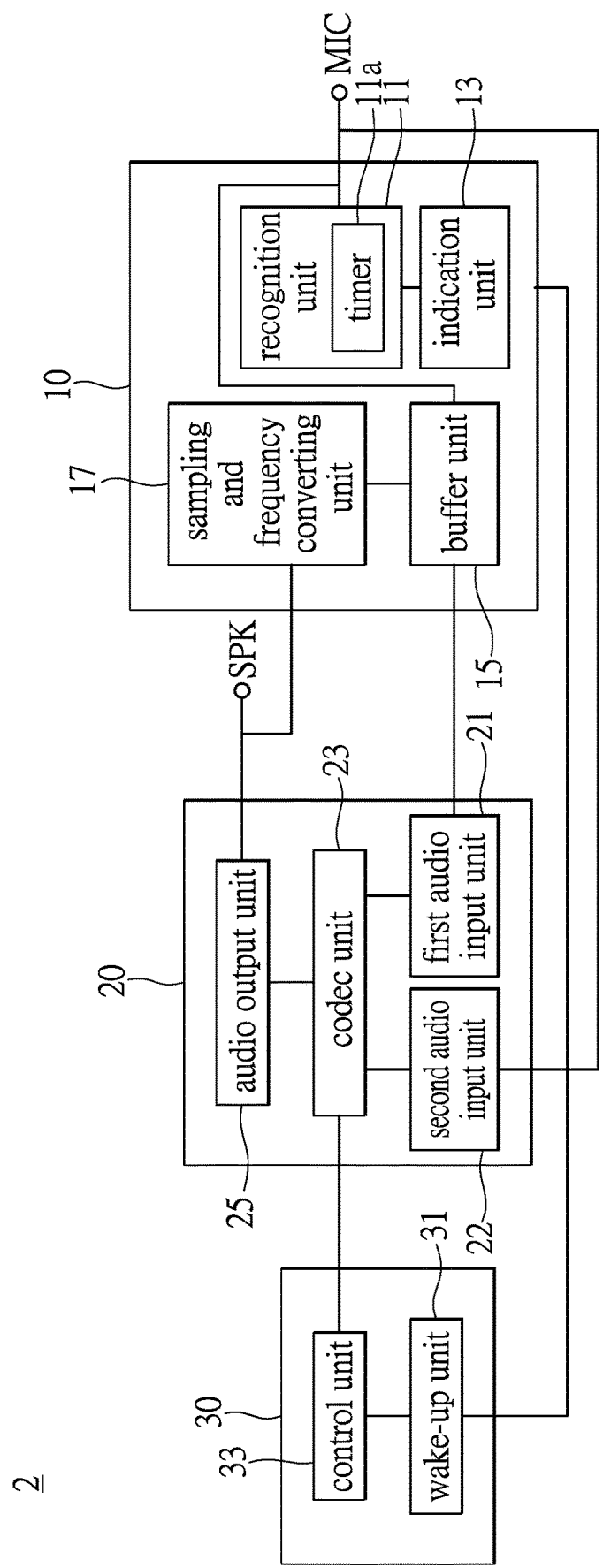
FIG. 2 shows a block diagram of a voice control system of another embodiment of the instant disclosure.

Referring to FIG. 2, FIG. 2 shows a block diagram of a voice control system of another embodiment of the instant disclosure. The voice control system 2 in this embodiment and the voice control system 1 shown in FIG. 1 have similar configurations. Thus, in the following embodiments, there only parts different from the embodiment in FIG. 1 are described, as the other parts are identical to the embodiment in FIG. 1. In addition, for easy instruction, similar reference numbers or symbols refer to like elements.

One of differences between the voice control system 2 in this embodiment and the voice control system 1 shown in FIG. 1 is that, in the voice control system 2, the recognition unit 11 of the audio detection module 10 further comprises a timer 11a, as shown in FIG. 2.

After the control unit 33 is woken up by the first indication signal and drives the voice control system 2 to operate in the working mode, the timer 11a starts to count. This is for determining whether it is necessary to stop running the voice control system 2 and to make the voice control system 2 return to the sleeping mode to reduce the power consumption of the electronic device. Specifically speaking, the moment when the voice control system 2 starts to operate in the working mode, the timer 11a starts to count for a predetermined time, such as 3 seconds or 5 seconds. If there is no control speech detected within this predetermined time (that is, there is no first audio data detected by the recognition unit 11 during this predetermined time after the wake-up speech is detected by the recognition unit 11), the recognition unit 11 then controls the indication unit 13 to transmit a second indication signal to the wake-up unit 31. As a result, the wake-up unit 31 stops the control unit 33 from working according to the second indication signal, and thus the voice control system 2 returns to the sleeping mode.

Moreover, another difference between the voice control system 2 in this embodiment and the voice control system 1 shown in FIG. 1 is that, in the voice control system 2, the audio detection module 10 further comprises a sampling and frequency converting unit 17, and the audio codec 20 further comprises an audio output unit 25. The sampling and frequency converting unit 17 is connected between the buffer unit 15 and the audio output unit 25 of the audio codec 20, and the audio output unit 25 is connected to the codec unit 23.

The voice control system 2 can also provide an audio playing function to the electronic device. During the process when the electronic device plays an audio data, the control module 30 transmits this audio data, which is to be played, to the codec unit 23 (herein, for ease of illustration, a second audio data refers to the audio data to be played in the following description), and drives the codec unit 23 to process the second audio data. Then, the audio output unit 25 outputs the processed second audio data to a speaker SPK for playing. It is worth noting that, at the same moment, the second audio data is also transmitted to the sampling and frequency converting unit 17, and then the sampling and frequency converting unit 17 converts the data format of the second audio data from a second sample rate, such as 48 kHz, to a first sample rate, such as 16 kHz. The data format of the first audio data is the first sample rate. After that, the sampling and frequency converting unit 17 temporarily stores the converted second audio data in the buffer unit 15 to use this second audio data as a reference audio data in the following audio process.

In one embodiment, during the process when a user provides a control speech to drive the voice control system 2 to accordingly control the electronic device, the second audio data transmitted from the audio output unit 25 to the speaker SPK for playing will also be received by the microphone MIC and become a noise in the first audio data. When the control module 30 is recognizing the control speech in the first audio data, this noise may influence the recognition. Thus, to effectively remove this noise from the first audio data, after the data format of the second audio data is converted by the sampling and frequency converting unit 17 and the converted second audio data is temporarily stored in the buffer unit 15, the control module 30 drives the codec unit 23 to read and process the first audio data and the second audio data, which are temporarily stored in the buffer unit 15. After that, the control module 30 uses the second audio data as a reference audio data, and accordingly removes part of first audio data which is identical to the reference audio data. In this manner, because the noise can be removed, the chances that the control module 30 may wrongly recognize the control speech will be reduced.

In another embodiment, the second audio data is also temporarily stored in the buffer unit 15 as a reference audio data. After receiving a first audio data including the second audio data, the recognition unit 11 removes part of first audio data, which is identical to the reference audio data, to effectively remove the noise in the first audio data, which comes from the second audio data received by the recognition unit 11. Then, the recognition unit 11 temporarily stores the processed first audio data in the buffer unit 15. After the control module 30 obtains the processed first audio data through the audio codec 20 and recognizes the control speech in the processed first audio data, the electronic device is controlled by the control module 30 according to the control speech.

It is worth noting that, in the embodiment where the recognition unit 11 needs to process the first audio data, the recognition unit 11 must have a greater operating capability. Moreover, the recognition unit 11 also needs to process the first audio data from the microphone MIC and the second audio data from the speaker SPK when other modules in the voice control system are operating in the sleep mode, so the power consumption of the voice control system will increase but the computation that the control module needs to do for recognizing the control speech can be decreased. Due to the larger power consumption, this kind of voice control system is suitable to be used in, for example, the home appliances that take commercial power as their power supply, such as a smart refrigerator or the like.

On the other hand, in the embodiment where the control module 30 processes the first audio data, the power consumption of the voice control system will be less. This kind of voice control system is suitable to be used in a portable electronic device, such as a smart phone, a tablet or the like.

As mentioned, during the process that a user provides a control speech to drive the voice control system 2 to control the electronic device, the second audio data played by the speaker SPK will be received by the microphone MIC. In other words, the first audio data received by the microphone MIC also includes the second audio data, and thus this first audio data at least comprises the audio data from a left channel and a right channel of the microphone MIC and the audio data from a left channel and a right channel of the speaker SPK. In brief, the first audio data received by the microphone MIC actually can come from at least four audio channels.

However, the memory of the buffer unit 15 is limited. For example, if the data format of the temporarily stored data are a 48 kHz sample rate and a 16-bit data length, to store one second audio data from the left channel of the microphone MIC and 1 second audio data from the right channel of the microphone MIC, there is a 192 KB memory needed. Usually, for recognizing features of human voice, the minimum sample rate is 8 kHz. Thus, in the voice control system 2, the data format of the temporarily stored data is determined to be a 16 kHz sample rate to store the audio data from more audio channels. To store the same amount of data, the buffer unit 15 uses less memory if the data format of the temporarily stored data is chosen to be the 16 kHz sample rate rather than the 48 kHz sample rate.

Figure 3:
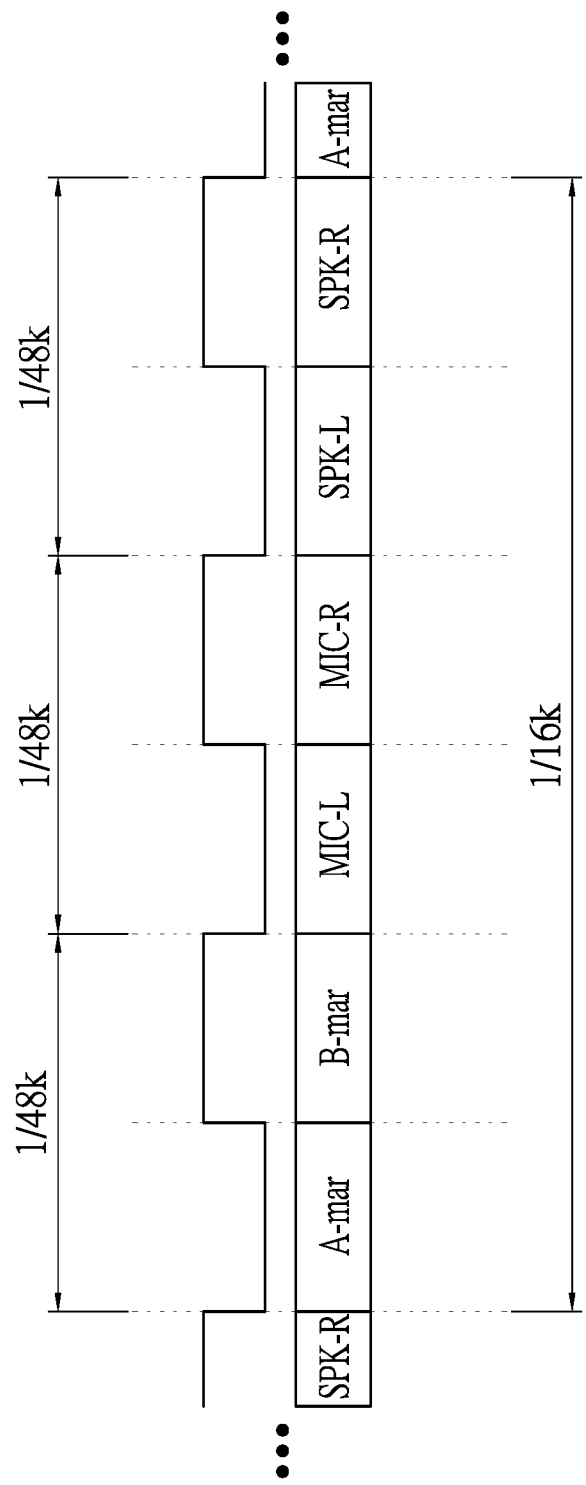
FIG. 3 shows a schematic diagram of an audio data stored in a buffer unit of one embodiment of the instant disclosure.

Referring to FIG. 3, FIG. 3 shows a schematic diagram of an audio data stored in a buffer unit of one embodiment of the instant disclosure. In this embodiment, the data format of the temporarily stored data is determined to be the 16 kHz sample rate and the 16-bit data length, and the temporarily stored data MIC-L, MIC-R, SPK-L and SPK-R to come from the left channel and the right channel of the microphone MIC and the left channel and the right channel of the speaker SPK. Thus, this temporarily stored data can be represented as FIG. 3.

Generally speaking, the sample rate of the digital audio interface, such as the codec unit 23, is higher than 16 kHz, such as 44.1 kHz or 48 kHz. Because the codec unit 23 has a sample rate higher than 16 kHz, in the voice control system 2, the sampling and frequency converting unit 17 converts the data format of the second audio data outputted by the audio output unit 25 from a second sample rate, such as 48 kHz, to a first sample rate, such as 16 kHz.

As shown in FIG. 3, the audio data MIC-L and MIC-R from the left channel and the right channel of the microphone MIC, and the audio data SPK-L and SPK-R from the left channel and the right channel of the speaker SPK are repeatedly arranged according to a specific order. In addition, before the audio data MIC-L and MIC-R from the left channel and the right channel of the microphone MIC, there are two markers A-mar and B-mar which have a predetermined data format. Once the control module 30 reads the markers A-mar and B-mar, the control module 30 can thus determine that the next data it reads is the audio data MIC-L and MIC-R from the left channel and the right channel of the microphone MIC, and that after the audio data MIC-L and MIC-R, the next data it reads is the audio data SPK-L and SPK-R from the left channel and the right channel of the speaker SPK. Additionally, the control module 30 can do a data reconstruction for the audio data MIC-L and MIC-R and the audio data SPK-L and SPK-R by recognizing the markers A-mar and B-mar first.

Still another difference between the voice control system 2 in this embodiment and the voice control system 1 shown in FIG. 1 is that, in the voice control system 2, the audio codec 20 further comprises a second audio input unit 22. The second audio input unit 22 is connected to the microphone MIC and the codec unit 23. When the control module 30 controls the electronic device to enter a calling mode or an audio recording mode (or any mode only to receive and transmit audio data but not to further control the electronic device), the control module 30 drives the second audio input unit 22 to directly receive the first audio data from the microphone MIC. After the codec unit 23 processes the first audio data, the control module 30 processes the processed first audio data. In this case, the first audio data does not need to be temporarily stored in the buffer unit 15.

Using the voice control system 2 in this embodiment, after providing the wake-up speech, a user does not need to wait and check whether the voice control system is woken up but can immediately say a control speech, which is convenient. In addition, the background sound (e.g., the second audio data) is temporarily stored as a reference audio data to remove the noise in the first audio data. Moreover, temporarily storing the audio data according to a low sample rate, such as 16 kHz, and reading the stored audio data according to a high sample rate, such as 48 kHz make it able to store the audio data from more audio channels in the limited memory of the buffer unit.

[One Embodiment of the Voice Control Method]

Figure 4:
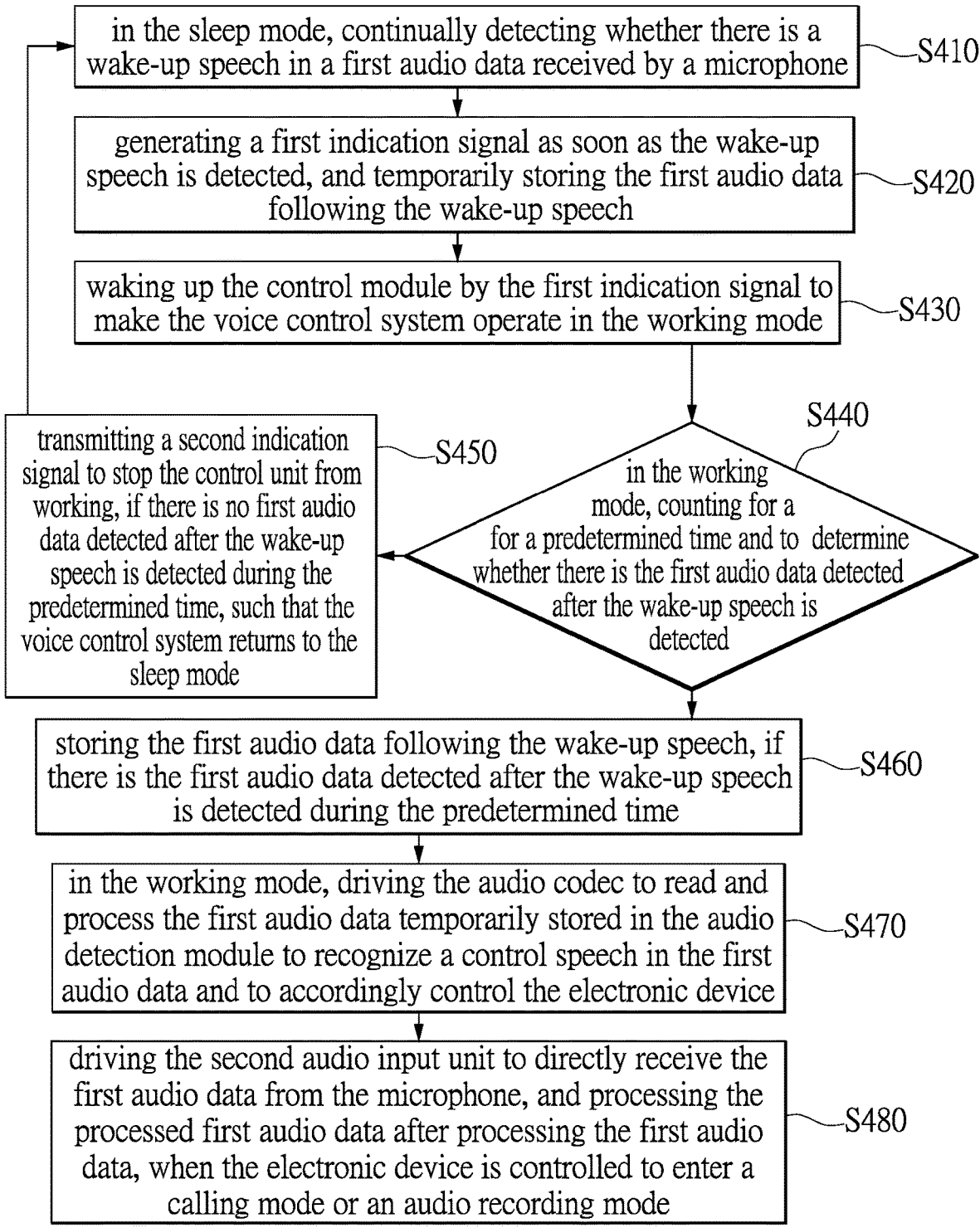
FIG. 4 shows a flow chart of a voice control method of one embodiment of the instant disclosure.

A voice control method that can be applied to the voice control systems 1 and 2 is provided in this embodiment. Referring to FIG. 4, FIG. 4 shows a flow chart of a voice control method of one embodiment of the instant disclosure.

As shown in FIG. 4, the voice control method 400 can be executed by the following steps. When the voice control system operates in the sleep mode, in step S410, the audio detection module continually detects whether there is a wake-up speech in the first audio data received by the microphone. After that, in step S420, when the wake-up speech is detected by the audio detection module, the audio detection module transmits a first indication signal to the control module, and at the same time temporarily stores the first audio data that is received after the wake-up speech. By the first indication signal, in step S430, the control module is woken up such that the voice control system enters the working mode.

In order to determine whether it is necessary to stop running the voice control system and to make the voice control system return to the sleep mode to reduce the power consumption of the electronic device, it goes to step S440. In step S440, in the working mode, the audio detection module counts for a predetermined time to check whether there is the first audio data received during the predetermined time. If there is no first audio data detected by the audio detection module during this predetermined time, it goes to step S450. In step S450, the audio detection module transmits a second indication signal to the control module to stop the control module from working, and as a result the voice control system returns to the sleep mode. On the other hand, there is the first audio data detected by the audio detection module during this predetermined time, it goes to step S460. In step S460, the audio detection module temporarily stores the first audio data which is detected after the wake-up speech is detected.

In step S470, the control module drives the audio codec to read and process the first audio data temporarily stored in the audio detection module to recognize the control speech in the first audio data and accordingly to control the electronic device.

It is worth noting that, after step S470, if the electronic device is controlled by the control module to enter a calling mode or an audio recording mode (or any mode only to receive and transmit audio data but not to further control the electronic device), it goes to step S480. In step S480, the control module drives the second audio input unit to directly receive the first audio data from the microphone, and thus in this case the first audio data does not need to be temporarily stored in the buffer unit. In addition, after the codec unit processes the first audio data, the control module processes the processed first audio data.

[Other Embodiments of the Voice Control Method]

Figure 5A:
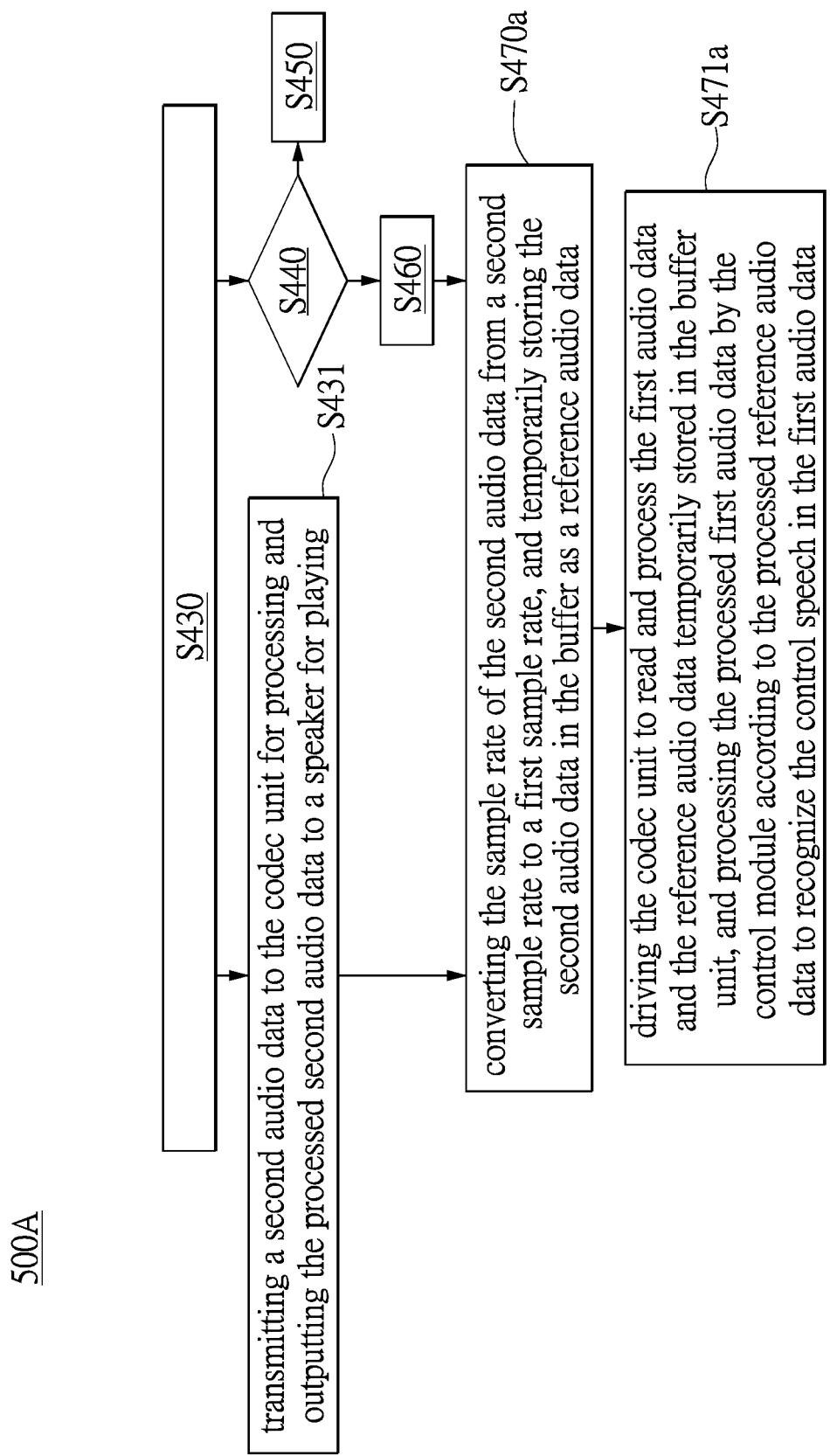
FIG. 5A and FIG. 5B show flow charts of a voice control method of other embodiments of the instant disclosure.
Figure 5B:
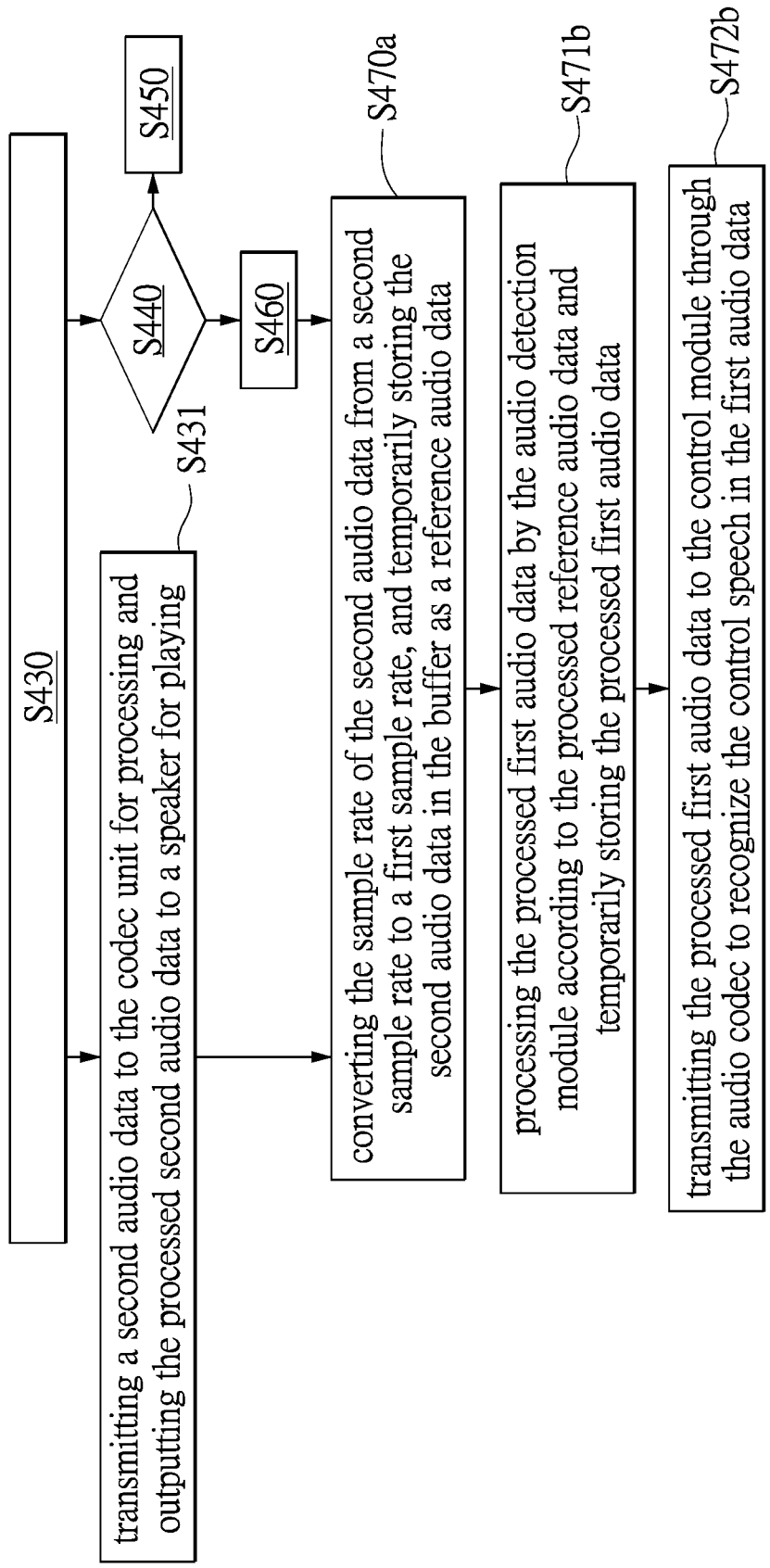

Two voice control methods 500A and 500B are provided in the following embodiments. Referring to FIG. 5A and FIG. 5B, FIG. 5A and FIG. 5B show flow charts of a voice control method of other embodiments of the instant disclosure. The voice control methods 500A and 500B in these embodiments are similar to the voice control method 400 in the last embodiment. Thus, in the follow-up embodiments, the instant disclosure will describe the part different from the aforementioned embodiment of FIG. 4, ignoring the part that is the same as the aforementioned embodiment of FIG. 4. Furthermore, similar reference numerals or marks indicate similar steps for ease of explanation.

Different from the voice control method 400, the voice control method 500A further comprises a step S431 after the step S430. The voice control systems provided in the above embodiments can provide an audio playing function to the electronic device, and thus in step S431, the control module transmits the second audio data, which is the audio data to be played, to the audio codec for data processing. After that, the audio codec outputs the processed second audio data to the speaker for playing.

Instead of going to step S470 in the voice control method 400, it goes to step S470a after steps S431 and S460 in the voice control method 500A. When the audio codec transmits the processed second audio data to the microphone to play, in step S470a, the audio codec also transmits the processed second audio data to the audio detection module to convert its data format and to temporarily store the converted second audio data as a reference audio data. Specifically speaking, the audio codec converts the data format of the second audio data from a second sample rate to a first sample rate, wherein the second sample rate, such as 48 kHz, is higher than the first sample rate, such as 16 kHz. After that, in step S471a, the control module drives the codec unit to read and process the first audio data and the reference audio data. Then, the control module processes the processed first audio data according to the reference audio data, to recognize the control speech in the first audio data and to accordingly control the electronic device.

Likewise, the voice control method 500B also comprises a step S431. In the voice control method 500B, it also goes to step S470*a* after step S431 and step S460. However, different from the voice control method 500A, it goes to S471*b* after step S470*a* in the voice control method 500B. In step S471*b*, the audio detection module processes the processed first audio data according the reference audio data and temporarily stores the processed first audio data in the buffer unit. In step S472*b*, the audio codec transmits the processed first audio data to the control module to recognize the control speech in the processed first audio data and to accordingly control the electronic device.

To sum up, by using the voice control system and the operation method provided by the instant disclosure, a user can control his electronic device by providing a wake-up speech and a control speech. Additionally, the voice control system and the operation method provided by the instant disclosure at least have the following advantages.

By using the voice control system and the operation method in the instant disclosure, a user can smoothly control his electronic device by voice, even under circumstances where it is hard for the user to check whether the voice control system has been woken up to recognize a control speech. For example, the user may be driving or walking.

In addition, in the voice control system and the operation method provided by the instant disclosure, the background sound is temporarily stored as a reference audio data to remove the noise in the audio data received by the microphone.

Moreover, by temporarily storing the audio data according to a low sample rate (such as, 16 kHz) and reading the stored audio data according to a high sample rate (such as, 48 kHz), the audio data from more audio channels can be stored in the limited memory of the buffer unit.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A voice control system, used in an electronic device, operating in a sleep mode and a working mode, comprising:
   an audio detection module, in the sleep mode, continually detecting whether there is a wake-up speech in a first audio data received by a microphone, wherein the audio detection module generates a first indication signal when the wake-up speech is detected, and temporarily stores the first audio data detected after the wake-up speech;
   an audio codec, connected to the audio detection module and comprising an audio output unit and a codec unit;
   a control module, connected to the audio detection module and the audio codec, wherein the control module transmits a second audio data to the codec unit and drives the codec unit to process the second audio data, and the audio output unit outputs the processed second audio data to a speaker for playing; and
   a buffer unit, connected to the microphone and the audio codec;
   wherein the voice control system operates in the working mode after the control module is woken up by the first indication signal, and in the working mode, the control module drives the audio codec to read and process the first audio data temporarily stored in the audio detection module to recognize a control speech and to accordingly control the electronic device,
   wherein the audio detection module further comprises a sampling and frequency converting unit, the sampling and frequency converting unit is connected between the buffer unit and the audio codec, the sampling and frequency converting unit converts the data format of the second audio data outputted by the audio output unit from a second sample rate to a first sample rate, and temporarily stores the second audio data in the buffer unit as a reference audio data, wherein the data format of the first audio data is the first sample rate and the second sample rate is higher than the first sample rate,
   wherein the control module drives the codec unit to read and process the first audio data and the reference audio data temporarily stored in the buffer unit, and removes part of the first audio data which is identical to the reference audio data.

2. The voice control system according to claim 1, wherein the audio detection module comprises:
   a recognition unit, in the sleep mode, receiving the first audio data and detecting whether there is the wake-up speech in the first audio data; and
   an indication unit, connected to the recognition unit and the control module;
   wherein the recognition unit controls the indication unit to generate and transmit the first indication signal to the control module when the wake-up speech is detected, and at the same time the buffer unit temporarily stores the first audio data detected after the wake-up speech.

3. The voice control system according to claim 2, wherein the control module comprises:
   a wake-up unit, connected to the indication unit of the audio detection module; and
   a control unit, connected to the wake-up unit;
   wherein in the sleep mode, the wake-up unit continually detects whether there is the first indication signal, and the wake-up unit wakes up the control unit when the wake-up unit receives the first indication signal, such that the voice control system starts to operate in the working mode.

4. The voice control system according to claim 3, wherein the recognition unit comprises a timer, in the working mode, after the timer counts for a predetermined time, the recognition unit controls the indication unit to transmit a second indication signal to the wake-up unit if there is no first audio data detected after the wake-up speech is detected, and the wake-up unit stops the control unit from working according to the second indication signal, such that the voice control system returns to the sleep mode.

5. The voice control system according to claim 3, wherein the audio codec comprises:
   a first audio input unit, connected to the buffer unit of the audio detection module to read the first audio data temporarily stored in the buffer unit,
   wherein the codec unit is connected to the first audio input unit and the control unit of the control module, wherein in the working mode, the control unit drives the codec unit to process the first audio data read by the first audio input unit to recognize the control speech in the first audio data and to accordingly control the electronic device.

6. The voice control system according to claim 1, wherein the control module drives the codec unit to read and process the first audio data and the reference audio data temporarily stored in the buffer unit, and the control module processes the processed first audio data according to the processed reference audio data to recognize the control speech in the first audio data and to accordingly control the electronic device.

7. The voice control system according to claim 5, wherein the recognition unit processes the processed first audio data according to the processed reference audio data and temporarily stores the processed first audio data in the buffer unit, and the processed first audio data is transmitted to the control module through the audio codec to recognize the control speech in the first audio data and to accordingly control the electronic device.

8. The voice control system according to claim 1, wherein the audio codec comprises a second audio input unit, the second audio input unit is connected to the microphone and the codec unit, after the control module controls the electronic device to enter a calling mode or an audio recording mode, the control module drives the second audio input unit to directly receive the first audio data from the microphone, and the control module processes the processed first audio data after the codec unit processes the first audio data.

9. A voice control method, applied to a voice control system, wherein the voice control system operates in a sleep mode and a working mode, and comprises an audio detection module, an audio codec and a control module, the audio codec is connected to the audio detection module, and the control module is connected to the audio codec and the audio detection module, the voice control method comprising:
  in the sleep mode, continually detecting whether there is a wake-up speech in a first audio data received by a microphone;
  generating a first indication signal when the wake-up speech is detected, and temporarily storing the first audio data detected after the wake-up speech;
  waking up the control module by the first indication signal to make the voice control system operate in the working mode;
  in the working mode, driving the audio codec to read and process the first audio data temporarily stored in the audio detection module to recognize a control speech in the first audio data and to accordingly control the electronic device;
  transmitting a second audio data to a codec unit of the audio codec and driving the codec unit to process the second audio data by the control module;
  outputting the processed second audio data to a speaker for playing by an audio output unit of the audio codec;
  converting the data format of the second audio data from a second sample rate to a first sample rate, and temporarily storing the second audio data in a buffer unit as a reference audio data, wherein the data format of the first audio data is the first sample rate and the second sample rate is higher than the first sample rate;
  driving the codec unit to read and process the first audio data and the second audio data temporarily stored in the buffer unit by the control module; and
  removing part of the first audio data which is identical to the reference audio data by the control module.

10. The voice control method according to claim 9, after the step of waking up the control module by the first indication signal to make the voice control system operate in the working mode, further comprising:
  in the working mode, counting for a predetermined time to determine whether there is the first audio data detected during the predetermined time after the wake-up speech is detected;
  storing the first audio data detected after the wake-up speech if there is the first audio data detected during the predetermined time after the wake-up speech is detected; and
  transmitting a second indication signal to stop the control unit from working if there is no first audio data detected during the predetermined time after the wake-up speech is detected, such that the voice control system returns to the sleep mode.

11. The voice control method according to claim 9, further comprising:
  driving the codec unit to read and process the first audio data and the reference audio data temporarily stored in the buffer unit, and processing the processed first audio data by the control module according to the processed reference audio data to recognize the control speech in the first audio data and to accordingly control the electronic device.

12. The voice control method according to claim 9, further comprising:
  processing the processed first audio data by the audio detection module according to the processed reference audio data and temporarily storing the processed first audio data; and
  transmitting the processed first audio data to the control module through the audio codec to recognize the control speech in the first audio data and to accordingly control the electronic device.

13. The voice control method according to claim 9, after the step of recognizing the control speech in the first audio data and accordingly controlling the electronic device, further comprising:
  driving the second audio input unit to directly receive the first audio data from the microphone, and processing the processed first audio data after processing the first audio data, when the electronic device is controlled to enter a calling mode or an audio recording mode.

* * * * *